US012773942B2

(12) United States Patent
Lee

(10) Patent No.: US 12,773,942 B2
(45) Date of Patent: Oct. 27, 2026

(54) FRONT LIGHT IRRADIATION ANGLE ADJUSTMENT SYSTEM AND METHOD

(71) Applicant: HYUNDAI MOBIS CO., LTD., Seoul (KR)

(72) Inventor: Jae Young Lee, Icheon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 182 days.

(21) Appl. No.: 18/498,204

(22) Filed: Oct. 31, 2023

(65) Prior Publication Data

US 2024/0198891 A1 Jun. 20, 2024

(30) Foreign Application Priority Data

Dec. 19, 2022 (KR) ........................ 10-2022-0177992

(51) Int. Cl.
*B60Q 1/08* (2006.01)
*B60Q 1/14* (2006.01)

(52) U.S. Cl.
CPC ............. *B60Q 1/085* (2013.01); *B60Q 1/143* (2013.01); *B60Q 2300/324* (2013.01)

(58) Field of Classification Search
CPC .. B60Q 1/085; B60Q 2300/324; B60Q 1/143; B60Q 2300/132; B60Q 2300/41; G06N 3/08
See application file for complete search history.

(56) References Cited

U.S. PATENT DOCUMENTS

2014/0029792 A1* 1/2014 Kato ........................ B60Q 1/08 362/466
2014/0175978 A1* 6/2014 Kobayashi ............ F21S 41/635 362/487
2018/0297511 A1* 10/2018 Park ........................ B60Q 1/143
2019/0324147 A1* 10/2019 Day ........................ G01S 7/026
2020/0124422 A1* 4/2020 Lin Sörstedt .......... G06V 20/56

FOREIGN PATENT DOCUMENTS

DE 102020123804 A1 * 3/2022 ............. G01S 7/497
JP 4371366 B2 * 11/2009 ............. B60Q 1/115
JP 2019038279 A * 3/2019 ............. B60Q 1/143
KR 101679880 B1 11/2016
WO WO-2017163414 A1 * 9/2017 ............... B60Q 1/14
WO WO-2021049062 A1 * 3/2021 ............. G06V 20/64

OTHER PUBLICATIONS

DE-102020123804-A1 EPO translation with paragraph numbers (Year: 2022).*

(Continued)

*Primary Examiner* — Joan T Goodbody
(74) *Attorney, Agent, or Firm* — NovoTechIP International PLLC

(57) ABSTRACT

Provided is technology for increasing stability/reliability of an adaptive front lighting system (AFLS) and driving convenience by adjusting a front light irradiation angle of a host vehicle based on analysis of a difference between an inclination angle of a road where the host vehicle is driving and an inclination angle of a road where an opposing vehicle is driving as the inclination angle of the road is changed.

5 Claims, 4 Drawing Sheets

(56) References Cited

OTHER PUBLICATIONS

JP-4371366-B2 EPO translation with paragraph numbers (Year: 2009).*
WO-2017163414 EPO translation with paragraph numbers (Year: 2017).*
WO-20210490620 EPO translation with paragraph numbers (Year: 2021).*
JP2019038279A EPO translation with paragraph numbers (Year: 2019).*
WO2017163414 WIPO translation of claims with paragraph numbers (Year: 2017).*
WO20210490620 EPO Translation of claims with paragraph numbers (Year: 2021).*

* cited by examiner

FRONT LIGHT IRRADIATION ANGLE ADJUSTMENT SYSTEM AND METHOD

CROSS-REFERENCE TO RELATED APPLICATIONS

This application claims priority under 35 U.S.C. § 119 to Korean Patent Application No. 10-2022-0177992, filed on Dec. 19, 2022, in the Korean Intellectual Property Office, the disclosure of which is incorporated herein by reference in its entirety.

TECHNICAL FIELD

The following disclosure relates to front light irradiation angle adjustment system and method, and more particularly, to front light irradiation angle adjustment system and method of a driver's own vehicle (or a host vehicle) to minimize possible glare occurring to a driver of a vehicle in front (or an opposing vehicle), the glare occurring due to a difference in pitch rotation angles of the host vehicle and the opposing vehicle by an effect that a front light irradiation angle of the host vehicle in driving seems to be directed upward.

BACKGROUND

A front light mounted in a vehicle may usually have a basic irradiation angle in which an upper surface of light by the front light is horizontal to a road to provide a driver of a host vehicle with the maximum viewing distance while preventing glare from occurring to a driver of a vehicle in front (or an opposing vehicle).

The number of vehicles mounted with an adaptive front lighting system (AFLS) has been increased in accordance with the recent technology development. The AFLS may increase the driver's night vision (or viewing distance) by adjusting front light brightness or a front light irradiation angle based on a driving environment.

In detail, the AFLS may perform front light irradiation angle control to provide the driver of the host vehicle with the maximum viewing distance while preventing glare from occurring to the driver of the opposing vehicle by using information such as the speed, steering angle, height sensor or shift lever of the vehicle.

For example, the AFLS may increase a forward viewing distance on a highway by adjusting the front light irradiation angle upward, and illuminate a vehicle driving direction more widely on a curved road by changing a lateral irradiation angle of the front light. Further, the AFLS may increase peripheral visibility at an intersection or in an urban area by increasing an irradiation width of the front light. When the vehicle in front exists, the AFLS may adjust an irradiation angle of a lamp corresponding to a region where the opposing vehicle is positioned to be downward to prevent glare from occurring to the driver of the opposing vehicle. Furthermore, the AFLS may adjust the irradiation angle downward by using the height sensor even when pitch direction rotation of the vehicle occurs due to a weight of a luggage in the trunk or sudden braking.

In all of the above cases, under the assumption that a road surface where the host vehicle is driving is flat ground, the AFLS may perform the front light irradiation angle control to provide the driver of the host vehicle with the maximum viewing distance and prevent view-obstruction (e.g., glare) of the driver of the opposing vehicle by transferring only a small amount of light energy to the driver's line of sight or a height of a side mirror.

However, an actual road surface may have not only the flat ground, but also, inevitably, an inclination angle.

Even when the inclination angle exists, it does not matter when the host vehicle and the opposing vehicle are on the same plane, in other words, when the two vehicles drive on a road having the same inclination angle. However, when the host vehicle and the opposing vehicle are driving on a road having different inclination angles, the inclination angles of the road surfaces are different from each other. Therefore, even when the host vehicle is controlled to have an ideal irradiation angle, a driver seat of the opposing vehicle may enter each region of a front light beam of the host vehicle, and a driver view of the opposing vehicle may thus be obstructed.

Here, the ideal irradiation angle may be an irradiation angle for preventing glare from occurring to the driver of the opposing vehicle while providing the driver of the host vehicle with the maximum viewing distance.

The AFLS may still detect the vehicle in front and adjust the irradiation angle downward. However, a possibility that proper vehicle detection is not made may be inevitably increased because the two vehicles drive on the road having the different inclination angles, and a position of the tail light or front light of the opposing vehicle may thus be detected in a different region than when the two vehicle drive on the road having the same inclination angle.

Accordingly, as shown in FIG. 1, when the host vehicle is climbing uphill, and the opposing vehicle is positioned on the flat ground at the top of the uphill, the driver of the vehicle in front may feel as if the host vehicle were irradiating the vehicle with its high beam because the host vehicle is in the same state as if the front light beam angle were directed upward to be in a pitch direction even though the host vehicle only irradiates the vehicle with the front light beam so that the top of the front light beam is directed parallel to the road, which is the ideal irradiation angle (or the basic irradiation angle).

That is, the height sensor of the host vehicle may output a value parallel to the road, which indicates that no pitch direction rotation of the vehicle has occurred. Therefore, the AFLS may set and maintain the basic irradiation angle (or the irradiation angle at which the top of the light is horizontal to the road) as the ideal irradiation angle. Therefore, the vehicle may be irradiated with the beam to a height of the side mirror or driver seat of the opposing vehicle, thus causing glare to the driver of the opposing vehicle.

SUMMARY

An embodiment of the present disclosure is directed to providing front light irradiation angle adjustment system and method that may adjust a front light irradiation angle of a host vehicle by analyzing front image data of the host vehicle, and analyzing a difference in inclination angles of a road surface where the host vehicle and an opposing vehicle are driving.

In this way, an embodiment of the present disclosure is directed to providing technology for increasing driving convenience by adjusting the irradiation angle of the host vehicle even in an environment where the inclination angle of the road is changed not to cause glare to a driver of the opposing vehicle.

In one general aspect, a front light irradiation angle adjustment system includes: an image input unit receiving front image data of a host vehicle; an image analysis unit analyzing the front image data to estimate a pitch rotation angle of an opposing vehicle included in the front image data; and a control generation unit generating a control signal for adjusting an irradiation angle of front lights of the host vehicle by comparing a set front light irradiation angle of the host vehicle with the estimated pitch rotation angle of the opposing vehicle host vehicle irradiation angle of front lights of the vehicle irradiation angle of front lights of the vehicle The system may further include a model generation unit generating a learning model that analyzes the input front image data by performing a supervised learning process of a pre-stored three dimensional (3D) object recognition network in advance, and storing the generated learning model in the image analysis unit.

The model generation unit may include: an image collector acquiring the front image data from the host vehicle; a host vehicle position analyzer recognizing a position of the host vehicle by using a differential global positioning system (DGPS) applied to the host vehicle, and applying the recognized position to a pre-stored 3D-high definition (HD) map to analyze a first inclination angle value of a road surface where the host vehicle is positioned; a relative position analyzer using a light detection and ranging (LiDAR) sensor mounted on the host vehicle to estimate a position of the opposing vehicle positioned in front of the host vehicle, and analyzing a second inclination angle value of a road surface where the opposing vehicle is positioned as estimated using the pre-stored 3D-HD map; a difference analyzer setting the pitch rotation angle of the opposing vehicle as a calculated difference between the first inclination angle value acquired by the host vehicle position analyzer and the second inclination angle value acquired by the relative position analyzer; and a learning processor performing the learning process of the stored 3D object recognition network by generating a learning data set including the front image data acquired by the image collector and the pitch rotation angle set by the difference analyzer, and generating the learning model based on a learning result.

The model generation unit may further include an initial condition determinator analyzing the front image data acquired by the image collector to determine whether a driving condition of the host vehicle and that of the opposing vehicle each meet predetermined conditions, and performs the learning process of the 3D object recognition network only when the driving conditions of the two vehicles each meet the predetermined conditions based on a determination result by the initial condition determinator.

The control generation unit may compare the set front light irradiation angle of the host vehicle with the estimated pitch rotation angle of the opposing vehicle, generate the control signal for adjusting the front light irradiation angle of the host vehicle based on a value acquired by subtracting the estimated pitch rotation angle of the opposing vehicle from the front light irradiation angle of the host vehicle when the estimated pitch rotation angle of the opposing vehicle is larger, and transmits the generated control signal to a linked control.irradiation angle of front lights of the vehicleirradiation angle of front lights of the vehicleirradiation angle of front lights of the vehicle In another general aspect, a front light irradiation angle adjustment method using a front light irradiation angle adjustment system in which each operation is performed by an electronic control unit includes: inputting an image of front image data of a host vehicle; analyzing the front image data to estimate a pitch rotation angle of an opposing vehicle included in the front image data; comparing a set front light irradiation angle of the host vehicle with the estimated pitch rotation angle of the opposing vehicle; generating a control signal for adjusting the front light irradiation angle of the host vehicle based on a value acquired by subtracting the pitch rotation angle of the opposing vehicle from the front light irradiation angle of the host vehicle when the pitch rotation angle of the opposing vehicle is larger; and adjusting the front light irradiation angle of the host vehicle by transmitting the control signal to a front light irradiation angle control.

In another example, the method includes: inputting an image (S100) of receiving front image data of a host vehicle; analyzing the image (S200) of analyzing the front image data input in the inputting of the image (S100) to estimate a pitch rotation angle of an opposing vehicle included in the front image data; generating control (S300) of comparing a set front light irradiation angle of front lights of the vehicle with the estimated pitch rotation angle of the opposing vehicle in the analyzing of the image (S200), and generating a control signal for adjusting the irradiation angle of front lights of the vehicle based on a value acquired by subtracting the pitch rotation angle of the vehicle in front from the front light irradiation angle of front lights of the vehicle that is controlled based on its current driving condition when the pitch rotation angle of the opposing vehicle is larger; and adjusting an irradiation angle (S400) of adjusting the front light irradiation angle of front lights of the vehicle by transmitting the control signal generated in the generating of the control (S300) to a front light irradiation angle control of the vehicle linked thereto.

The method in which in the analyzing of the image (S200), the front image data is analyzed using a stored learning model, may further include generating a model (S10) of generating the learning model that analyzes the input front image data by performing a supervised learning process of a pre-stored three dimensional (3D) object recognition network before the analyzing of the image (S200) is performed.

The generating of the model (S10) may include: collecting the image (S11) of acquiring the front image data from the vehicle; analyzing a host vehicle position (S12) of recognizing information on a precise position of the vehicle by using a differential global positioning system (DGPS) applied to the vehicle, and applying the recognized precise position to a pre-stored 3D-high definition (HD) map to analyze an inclination angle value of a road surface where the vehicle is positioned; analyzing a relative position (S13) of using a light detection and ranging (LiDAR) sensor mounted on the vehicle to estimate a position of the opposing vehicle positioned in front of the vehicle, and analyzing an inclination angle value of a road surface where the opposing vehicle is positioned by applying its position estimated using the pre-stored 3D-HD map; analyzing a difference (S14) of setting, as the pitch rotation angle of the opposing vehicle, a calculated difference between the inclination angle value acquired in the analyzing of the host vehicle position (S12) and the inclination angle value acquired in the analyzing of the relative position (S13); and processing learning (S15) of performing the learning process of the stored 3D object recognition network by generating a learning data set including the front image data acquired in the collecting of the image (S11) and the pitch rotation angle set in the analyzing of the difference (S14), and generating the learning model based on a learning result.

The generating of the model (S10) may further include determining an initial condition (S16) of determining whether the driving condition of the vehicle and that of the opposing vehicle each meet predetermined conditions by analyzing the front image data acquired in the collecting of the image (S11) before the analyzing of the host vehicle position (S12) is performed, and the learning process of the 3D object recognition network is performed only when the driving conditions of the two vehicles each meet the predetermined conditions based on a determination result in the determining of the initial condition (S16).

DETAILED DESCRIPTION

Figure 1:
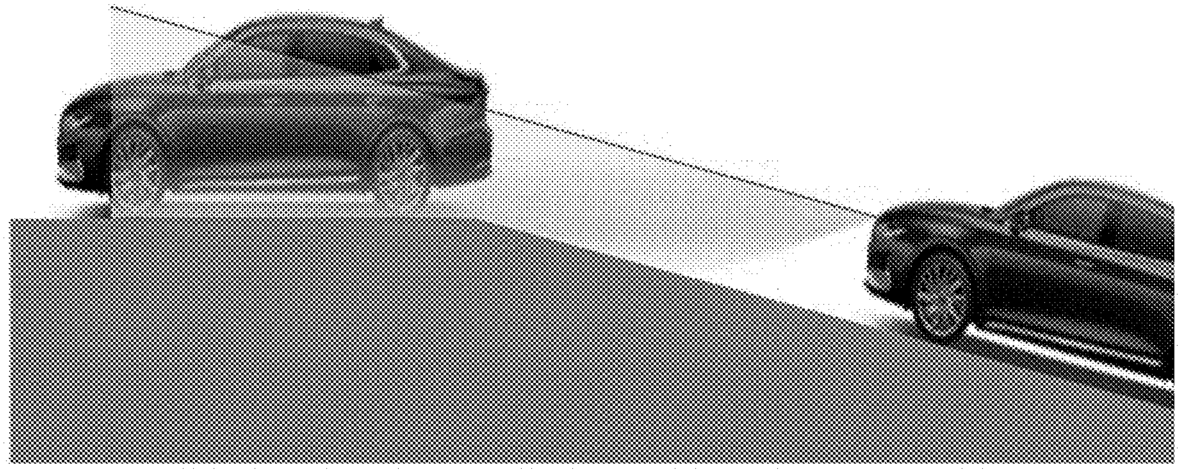
FIG. 1 is an exemplary view of applying conventional front light irradiation angle adjustment technology in which glare occurs to a driver of a vehicle in front due to a difference in inclination angles of a road surface where a host vehicle and the vehicle in front are driving.

Various objects, advantages and features of the present disclosure are become apparent from the following description of embodiments with reference to the accompanying drawings. The following descriptions of specific structures and functions are provided only to describe the embodiments based on a concept of the present disclosure. Therefore, the embodiments of the present disclosure may be implemented in various forms, and the present disclosure is not limited thereto. Embodiments of the present disclosure may be variously modified and may have several forms, and specific embodiments are thus shown in the accompanying drawings and described in detail in the specification or the present application. However, it is to be understood that the present disclosure is not limited to the specific embodiments, and includes all modifications, equivalents, and substitutions included in the spirit and the scope of the present disclosure. Terms such as 'first', 'second', or the like may be used to describe various components, and the components are not to be construed as being limited to the terms. The terms are used only to distinguish one component from another component. For example, a 'first' component may be named a 'second' component and the 'second' component may also be named the 'first' component, without departing from the scope of the present disclosure. It is to be understood that when one component is referred to as being connected to or coupled to another component, the one component may be connected directly to or coupled directly to another component or be connected to or coupled to another component with a third component interposed therebetween. On the other hand, it is to be understood that when one component is referred to as being connected directly to or coupled directly to another component, the one component may be connected to or coupled to another component without a third component interposed therebetween. Other expressions to describe a relationship between the components, i.e., "~between" and "directly between" or "adjacent to" and "directly adjacent to", should be interpreted in the same manner as above. Terms used in the specification are used to describe the specific embodiments, and are not intended to limit the present disclosure. A term of a singular number may include its plural number unless explicitly indicated otherwise in the context. It is to be understood that a term "include," "have," or the like used in the specification specifics the existence of features, numerals, steps, operations, components, parts or combinations thereof, and does not preclude the existence or addition of one or more other features, numerals, steps, operations, components, parts or combinations thereof. Unless otherwise defined, all terms including technical and scientific terms used herein have the same meaning as commonly understood by those skilled in the art to which the present disclosure pertains. It is to be further understood that terms, such as those defined in commonly used dictionaries, should be interpreted as having a meaning that is consistent with their meaning in the context of the relevant art and is not to be interpreted in an idealized or overly formal sense unless expressly so defined herein. Hereinafter, the embodiments of the present disclosure are described in detail with reference to the accompanying drawings. Like reference numerals denote like components throughout the drawings.

In addition, a system may be a set of components, including devices, mechanisms, means and the like, organized and regularly interacting with each other to perform a required function.

A basic irradiation angle of a front light may be set so that the top of the light is horizontal to a road to prevent glare from occurring to a driver of a nearby vehicle (e.g., opposing vehicle) while providing a driver of a host vehicle with the maximum viewing distance. However, glare may occur to the driver of the opposing vehicle because an effect that an irradiation angle seems to be directed upward occurs when a vertical angle of a driving direction of the host vehicle is larger than a vertical angle of a vehicle in front.

In other words, no glare occurs to the driver of the opposing vehicle because an output front light beam is not transferred to a height of the front light or above when the host vehicle and the opposing vehicle positioned in front are positioned on a road having the same inclination angle.

However, when road angles between the host vehicle and the opposing vehicle are different from each other, in other words, when the vehicles are positioned on a road having different inclination angles, the host vehicle and the opposing vehicle may have different vertical progression angles (or pitches), and the side mirror or driver seat of the opposing vehicle may be irradiated with the front light beam of the host vehicle.

The reason is that the driver of the opposing vehicle may feel the same as if the front light irradiation angle of the host vehicle is directed upward when a vertical angle based on the driving direction of the host vehicle is larger than the vertical angle based on the driving direction of the opposing vehicle.

In order to solve these problems, the front light irradiation angle adjustment system and method according to an embodiment of the present disclosure aim to minimize view-obstruction or the like of the opposing vehicle by adjusting the front light irradiation angle of the host vehicle when the vertical angle based on the driving direction of the host vehicle and the vertical angle based on the driving direction of the opposing vehicle are different from each other.

Accordingly, the front light irradiation angle adjustment system and method according to an embodiment of the present disclosure relate to technology for controlling the front light irradiation angle of the host vehicle by recognizing the vertical angle of the driving direction of the opposing vehicle positioned in the front by using a front camera image to thus solve a problem that glare may occur to the driver of the opposing vehicle due to the difference in the road angles between the host vehicle and the opposing vehicle.

In detail, in a stable driving state where a speed of the opposing vehicle and a speed of the host vehicle are constant, and the speeds of four wheels of the host vehicle has a small standard deviation, the system and method of the present disclosure may calculate the inclination angles of the road where the host vehicle is positioned and the road where the opposing vehicle is positioned, using a differential global positioning system (DGPS), a light detection and ranging (LiDAR) sensor, and a three-dimensional (3D)-high definition (HD) map. When the two vehicles have stable driving motions, the system and method of the present disclosure may calculate a pitch value of the vehicle by using the inclination angle of the road because the inclination angle of the road coincides with the vertical angle of the vehicle driving direction. Next, the system and method of the present disclosure may use the LiDAR sensor to generate a learning data set by using, as ground truth (GT), the 3D bounding box (BBox) coordinate value and yaw value of an object, and its pitch rotation angle, which may be calculated from a difference in the inclination angles of the two vehicles, and then perform a learning process of a 3D object recognition network.

The system and method of the present disclosure may use a learning model based on a result of the learning process to analyze the pitch rotation angle of the opposing vehicle positioned in front from the front camera image even when the vehicle is a mass-produced vehicle not mounted with the expensive DGPS, LiDAR sensor, or 3D-HD map, and adjust the front light irradiation angle by comparing the analyzed pitch rotation angle with a threshold value.

As described above, the system and method of the present disclosure may use an adaptive front lighting system (AFLS) automatically controlling the front light irradiation angle based on a driving state of the host vehicle to automatically control the front light irradiation angle even in an environment where the inclination angle of the road is changed, thus increasing driving convenience by causing no glare to the driver of the opposing vehicle, and further improving driving safety by allowing the driver of the host vehicle to maintain a wide field of view.

In short, even when the host vehicle, which is a vehicle mounted with the AFLS, drives on a ramp based on the driving direction of the host vehicle, a height sensor of the host vehicle may output a value parallel to the road, which indicates that no pitch direction rotation of the vehicle occurs. Therefore, the AFLS may set and maintain the basic irradiation angle (or the irradiation angle at which the top of the light is horizontal to the road) as an ideal irradiation angle.

In this case, it does not matter when the opposing vehicle driving near the host vehicle is driving on a ramp having the same inclination angle as the host vehicle. However, when the two vehicles drive on a road having different inclination angles, a point up to a height of the side mirror or driver seat of the opposing vehicle may be irradiated with the light beam having the ideal irradiation angle set in the host vehicle, thus causing glare to the driver of the opposing vehicle.

In order to solve this problem, the host vehicle may determine that its vertical progression angles and the opposing vehicle are different from each other, and prevent glare from occurring to the driver of the opposing vehicle by adjusting its front light irradiation angle downward.

However, a general vehicle may be mounted with a global positioning system (GPS) and a map, which may simply inform only a movement path on a two-dimensional plane. Therefore, the DGPS, the LiDAR sensor, or the 3D-HD map needs to be installed in the vehicle to acquire information on the vertical angles of the driving directions of the host vehicle and the opposing vehicle. The DGPS, the LiDAR sensor, or the 3D-HD map is expensive, and in reality, it is thus impossible to easily mount the equipment on the vehicle.

Accordingly, the front light irradiation angle adjustment system and method according to an embodiment of the present disclosure may allow only a test vehicle to be mounted with the DGPS, the LiDAR sensor, or the 3D-HD map to generate the best learning data set so that the pitch rotation angle of the opposing vehicle may be analyzed only using the front image data while using the 3D object recognition network to perform the learning process so that the pitch rotation angle of the opposing vehicle may be analyzed from front image data.

Figure 2:
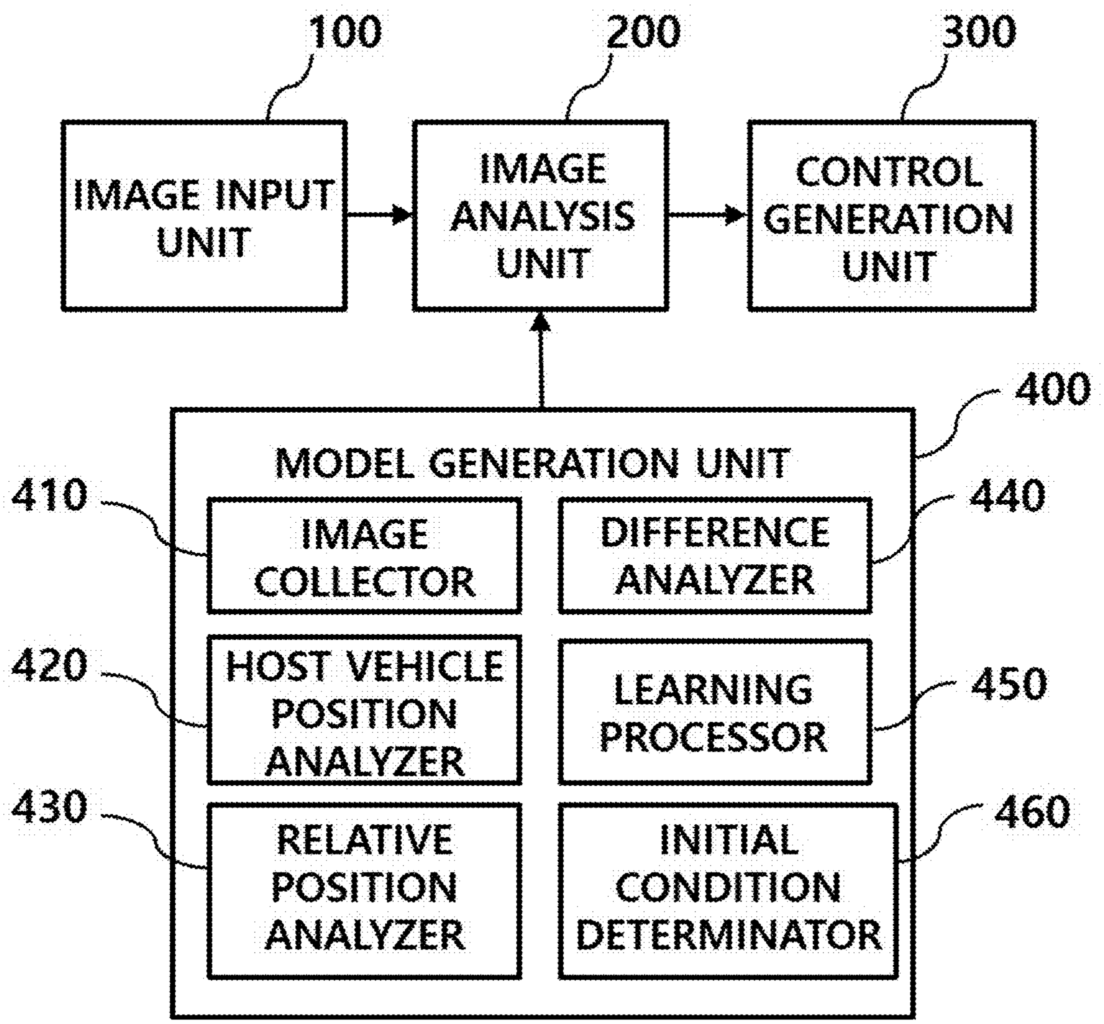
FIG. 2 is an exemplary configuration diagram showing a front light irradiation angle adjustment system according to an embodiment of the present disclosure.

FIG. 2 shows a configuration diagram of the front light irradiation angle adjustment system according to an embodiment of the present disclosure.

As shown in FIG. 2, the front light irradiation angle adjustment system according to an embodiment of the present disclosure may include an image input unit 100, an image analysis unit 200, and a control generation unit 300. Each component may perform an operation through an arithmetic processing means such as an electronic control unit (ECU) including a computer that transmits and receives data through an in-vehicle communication channel.

The description describes each component in detail as follows.

The image input unit 100 may receive front image data of a host vehicle.

That is, the image input unit 100 may receive the front image data of the host vehicle.

The front image data is image data showing the front of the vehicle that is generated by a front camera mounted/installed in the vehicle, a surround view monitor (SVM) front camera system or the like, and means for generating the front image data is not limited as long as a front situation of the vehicle may be monitored.

In addition, the host vehicle is a mass-produced vehicle under a normal condition and may not be mounted with the expensive the DGPS, the LiDAR sensor, or the 3D-HD map. However, the adaptive front lighting system (AFLS) may be applied to this vehicle, and the front light irradiation angle may be adjusted based on a driving condition.

The image analysis unit 200 may analyze the front image data input by the image input unit 100 to estimate the pitch rotation angle of the opposing vehicle included in the front image data.

Here, the front image data itself may be data acquired from the host vehicle. Therefore, the pitch rotation angle of the opposing vehicle that is estimated by the image analysis unit 200 may be used to determine how much the opposing vehicle is pitch-rotated based on the host vehicle.

In detail, the image analysis unit 200 may analyze the input front image data by using a pre-stored learning model, and estimate the pitch rotation angle of the opposing vehicle included in the front image data.

To this end, the front light irradiation angle adjustment system according to an embodiment of the present disclosure may further include a model generation unit 400 as shown in FIG. 2.

The model generation unit 400 may generate the learning model that analyzes the input front image data and outputs the pitch rotation angle (or the vertical angle of the driving direction) of the vehicle, that is, an object included in the image by performing a supervised learning process of the pre-stored 3D object recognition network in advance.

The learning model generated by the model generation unit 400 may be stored in the image analysis unit 200 to perform an operation.

As shown in FIG. 2, the model generation unit 400 may include an image collector 410, a host vehicle position analyzer 420, a relative position analyzer 430, a difference analyzer 440, a learning processor 450, and an initial condition determinator 460.

The image collector 410 may acquire the front image data from the vehicle.

Here, the vehicle whose front image data is acquired by the image collector 410 may be the test vehicle mounted/installed with the DGPS, the LiDAR sensor, or the 3D-HD map, and the image collector 410 may acquire any front image data from the vehicle in various driving states.

The 3D object recognition network may recognize the 3D bounding box (BBox) of the vehicle included in the front image data. The vehicle may be positioned on the ground in a general driving image, and a yaw value of a horizontal driving direction of the vehicle may be recognized by a sensor such as the LiDAR sensor.

However, it is impossible to generate the learning data set of the pitch values requiring information on the front and rear heights of the vehicle. The reason is that vehicle front information is not known because the LiDAR sensor mounted on the rear reflects all the light beams.

Accordingly, in order to include the pitch rotation angle in the data set, the front light irradiation angle adjustment system according to an embodiment of the present disclosure may perform a detailed labeling operation by the host vehicle position analyzer 420, the relative position analyzer 430, and the difference analyzer 440.

The host vehicle position analyzer 420 may recognize information on a precise position of the vehicle by using the differential GPS (DGPS) applied to the vehicle, and analyze an inclination angle value of the road surface where the vehicle is positioned by applying the precise position recognized using the pre-stored 3D-HD map.

In other words, the host vehicle position analyzer 420 may recognize the position of the host vehicle by using the DGPS. The host vehicle position analyzer 420 may then analyze the inclination angle value of the road surface for the recognized position of the host vehicle by using the 3D-HD map.

The relative position analyzer 430 may use the LiDAR sensor mounted on the vehicle to estimate the position of the opposing vehicle positioned in front of the vehicle.

That is, the relative position analyzer 430 may analyze the distance between the opposing vehicle positioned in front of the vehicle and the host vehicle by using the LiDAR sensor mounted on the vehicle.

The host vehicle position analyzer 420 may recognize the information on the precise position of the vehicle by using the DGPS applied to the vehicle. Therefore, the relative position analyzer 430 may estimate information on a precise position of the opposing vehicle by using the analyzed distance.

In addition, the relative position analyzer 430 may analyze the inclination angle value of the road surface where the opposing vehicle is estimated to be positioned by using the pre-stored 3D-HD map.

Here, the 3D-HD map is a 3D high definition map, which further includes information on the inclination angle of the road, a height of the road, and an object (e.g., traffic light) around the road than a previous two-dimensional flat map. Therefore, it is possible to analyze the inclination angle value of the road surface for the recognized position when the host vehicle position analyzer 420 and the relative position analyzer 430 recognize the information on the precise position of the vehicle by using the DGPS or the like.

The difference analyzer 440 may set, as the pitch rotation angle of the opposing vehicle, a calculated difference between the inclination angle value (or the inclination angle value of the road surface where the test vehicle is positioned) acquired by the host vehicle position analyzer 420 and the inclination angle value (or the inclination angle value of the road surface where the opposing vehicle positioned in front of the test vehicle is positioned) acquired by the relative position analyzer 430.

That is, in order to determine how much the opposing vehicle is pitch-rotated based on the host vehicle, the difference analyzer 440 may set the pitch rotation angle of the opposing vehicle by calculating the inclination angle values of the road surface where the respective vehicles are positioned and calculating a difference between the calculated inclination angle values.

The learning processor 450 may perform the learning process of the stored 3D object recognition network by generating the learning data set including the front image data acquired by the image collector 410 and the pitch rotation angle set by the difference analyzer 440.

In detail, the learning processor 450 may label the front image data and each object included in the front image data, and generate the learning data set including the pitch rotation angle as labeled data.

The learning processor 450 may generate the learning model based on a learning result and store the same in the image analysis unit 200.

In this way, the image analysis unit 200 may extract the object (or the vehicle) included in the input front image data, estimate the pitch rotation angle of each object, and output the same.

Here, in order to reduce an amount of learning computation of the learning model and improve learning accuracy, the front light irradiation angle adjustment system according to an embodiment of the present disclosure may further perform an operation of the initial condition determinator 460 determining whether to generate the learning data set by analyzing the front image data before performing the learning process.

The initial condition determinator 460 may analyze the front image data acquired by the image collector 410 to determine whether the driving condition of the vehicle and that of the opposing vehicle each meet predetermined conditions.

In detail, the initial condition determinator 460 may analyze the front image data acquired by the image collector 410 to analyze the speed of the opposing vehicle (or the host vehicle in front) and the speed of the host vehicle. Here, the initial condition determinator 460 may receive the speed of the host vehicle from a speedometer mounted in the vehicle, and analyze the speed of the opposing vehicle by using the speedometer of the host vehicle and information on the distance to the opposing vehicle in the front image data (which may be estimated using the LiDAR sensor).

In addition, the initial condition determinator 460 may receive the wheel speed of the host vehicle from the linked sensor.

The initial condition determinator 460 may first determine the driving condition of the opposing vehicle based on this speed. The initial condition determinator 460 may determine whether the vehicle in front exists and whether the vehicle speed of the existing vehicle is constant as the driving condition of the opposing vehicle.

The initial condition determinator 460 may not use the corresponding front image data as data to generate the learning data set based on a determination result when the vehicle in front does not exist or the vehicle speed of the existing vehicle is not constant.

The initial condition determinator 460 may determine the driving condition of the vehicle (or the driving condition of the host vehicle) based on the determination result when the vehicle having the constant speed exists in front. The initial condition determinator 460 may determine, as the driving condition of the vehicle, whether the speed of the host vehicle is changed by a value less than a predetermined threshold value or whether the standard deviation of the speeds of the four wheels of the host vehicle is changed by a value less than a predetermined threshold value.

That is, when momentary shaking occurs in the vehicle due to vibration or the like based on a road surface condition, the position or angle of the vehicle may be changed on the front image data acquired at that instant. However, this case corresponds to an instantaneous movement. Accordingly, when the initial condition determinator 460 analyzes the inclination angle value of the road surface where the host vehicle is positioned or the inclination angle value of the road surface where the opposing vehicle is positioned based thereon, this analysis is very likely to be inaccurate.

Therefore, the driving condition of the vehicle may need to be stably matched with the inclination angle of the road surface.

To this end, the host vehicle position analyzer 420, the relative position analyzer 430, the difference analyzer 440, and the learning processor 450 may perform their operations only on data in a state that is determined stable by the initial condition determinator 460 where the speed of the host vehicle is constant, the estimated speed of the opposing vehicle included in the front image data is constant, and the standard deviation of the speeds of the four wheels of the host vehicle is small to store the data as the ground truth (GT), thus generating the learning data set.

The learning data set generated in this way may include the front image data and the labeled data (e.g., 3D BBox coordinates, yaw value, and pitch rotation angle) to recognize the vehicle position included in the input front image data.

The 3D object recognition network is a 3D object recognition deep learning network, and may include a base network including a plurality of convolutional layers extracting features of an image, and a 3D object detection head layer classifying candidate regions (or anchor boxes) based on the extracted features and adjusting their positions and sizes.

When analyzing the input front image data through the 3D object recognition network, a background region class and an object (or vehicle) region class may be recognized, and a nearby 3D anchor box may thus recognize the vehicle in front. Here, the meanings of 9 output channels of the 3D object recognition network are as shown in Expression 1 below.

$$\left(\frac{x-x_a}{w_a}, \frac{y-y_a}{h_a}, \frac{z-z_a}{d_a}, \log\frac{w}{w_a}, \log\frac{h}{h_a}, \log\frac{d}{d_a}, \frac{\theta_y-\theta_{ay}}{\pi}, \frac{\theta_p-\theta_{ap}}{\pi}, c\right) \quad \text{[Expression 1]}$$

Here, x, y, and z represent the center points of the recognized candidate regions; w, h, d. ⊖y, and ⊖p represent the width, length, height, yaw and pitch rotation angles of the vehicle; a represents the anchor box; and c is a classification value, which indicates a state of the background region class or that of the vehicle region class.

The 3D object recognition network may perform learning so that an inferred value is equal to a label only for a box close to a labeled position among the 3D anchor boxes defined for each output position. In Expression 1 above, the position, size, and angle items may use a mean square error to acquire a loss, and c (here, zero is the background, and 1 is the vehicle) may add a cross entropy loss to perform the learning by using a stochastic gradient descent method. A 3D position of the vehicle on the image may be output when the front image data is input to the 3D object recognition network that completes its learning.

As such, the image analysis unit 200 may analyze the input front image data by using the pre-stored learning model generated by the model generation unit 400 to estimate the pitch rotation angle of the opposing vehicle included in the front image data.

The control generation unit 300 may generate a control signal for adjusting the front light irradiation angle of front lights of the vehicle by comparing a currently-set front light irradiation angle of front lights of the vehicle with the pitch rotation angle of the vehicle in front that is estimated by the image analysis unit 200.

Here, the front light of every vehicle may have the same main function, and a control range of the irradiation angle may not be greatly deviated. However, a mounting position of the front light may be different for each vehicle. Therefore, the basic irradiation angle (or the ideal irradiation angle, that is, the irradiation angle in which the top of the front light beam is directed to be parallel to the road where the vehicle is driving) or the adjustment-controlled irradiation angle (or the irradiation angle controlled to be adjusted from the basic irradiation angle based on the information such as the vehicle speed, steering angle, height sensor and shift lever of the host vehicle), by the AFLS, may be different for each vehicle, and the present disclosure is not limited thereto.

In detail, the control generation unit 300 may compare the currently-set front light irradiation angle (e.g., basic irradiation angle or adjustment-controlled irradiation angle) of the vehicle with the pitch rotation angle of the vehicle in front that is estimated by the image analysis unit 200, generate the control signal for adjusting the irradiation angle of front lights of the vehicle based on a value acquired by subtracting the pitch rotation angle of the vehicle in front from the front light irradiation angle of front lights of the vehicle that is controlled based on its current driving condition when the pitch rotation angle of the vehicle in front is larger, and transmit the generated signal to the linked control (e.g., AFLS).

Here, the currently-set front light irradiation angle may indicate the basic irradiation angle or the adjustment-controlled irradiation angle, by the AFLS.

When the pitch rotation angle of the opposing vehicle (or the vehicle in front) that is analyzed based on the host vehicle is larger than the currently-set front light irradiation angle of the host vehicle, glare may occur to the driver of the opposing vehicle due to the inclination angle of the road surface where the host vehicle is positioned. Therefore, the control generation unit 300 may adjust the front light irradiation angle based on the value acquired by subtracting the pitch rotation angle of the opposing vehicle (or the vehicle in front) that is analyzed based on the host vehicle from the currently-set front light irradiation angle of the host vehicle.

Figure 3:
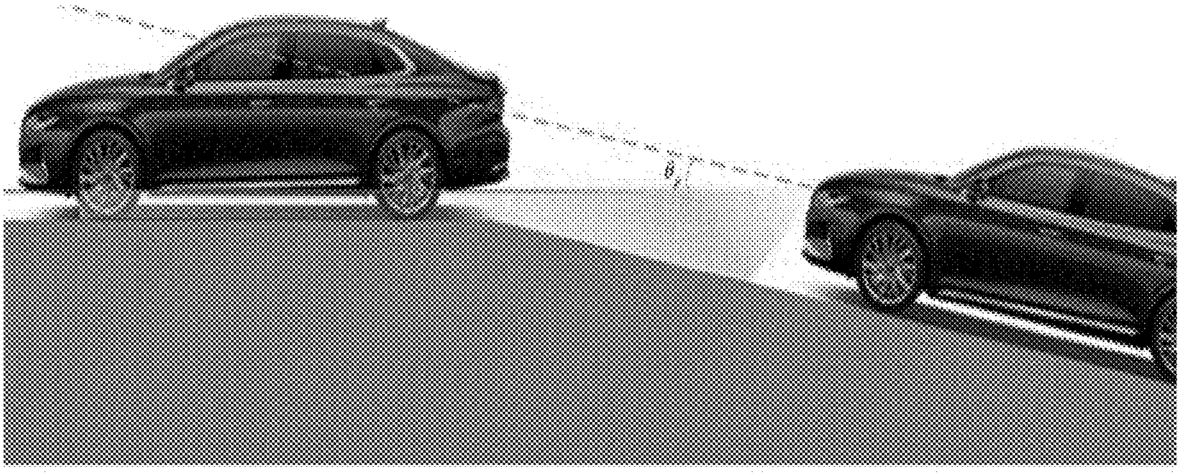
FIG. 3 is an exemplary view of applying front light irradiation angle adjustment system and method according to an embodiment of the present disclosure in which a front light inclination angle of a host vehicle is adjusted based on a difference in inclination angles of a road surface where the host vehicle and a vehicle in front are driving.

In this way, as shown in FIG. 3, when the vertical angles of the driving directions of the host vehicle and the opposing vehicle are different from each other due to the environment where the inclination angle of the road is changed, the front light irradiation angle adjustment system according to an embodiment of the present disclosure may control the front light irradiation angle of the host vehicle, thus increasing the driving convenience by causing no glare to the driver of the opposing vehicle, and improving the driving safety by allowing the driver of the host vehicle to maintain the wide field of view.

Figure 4:
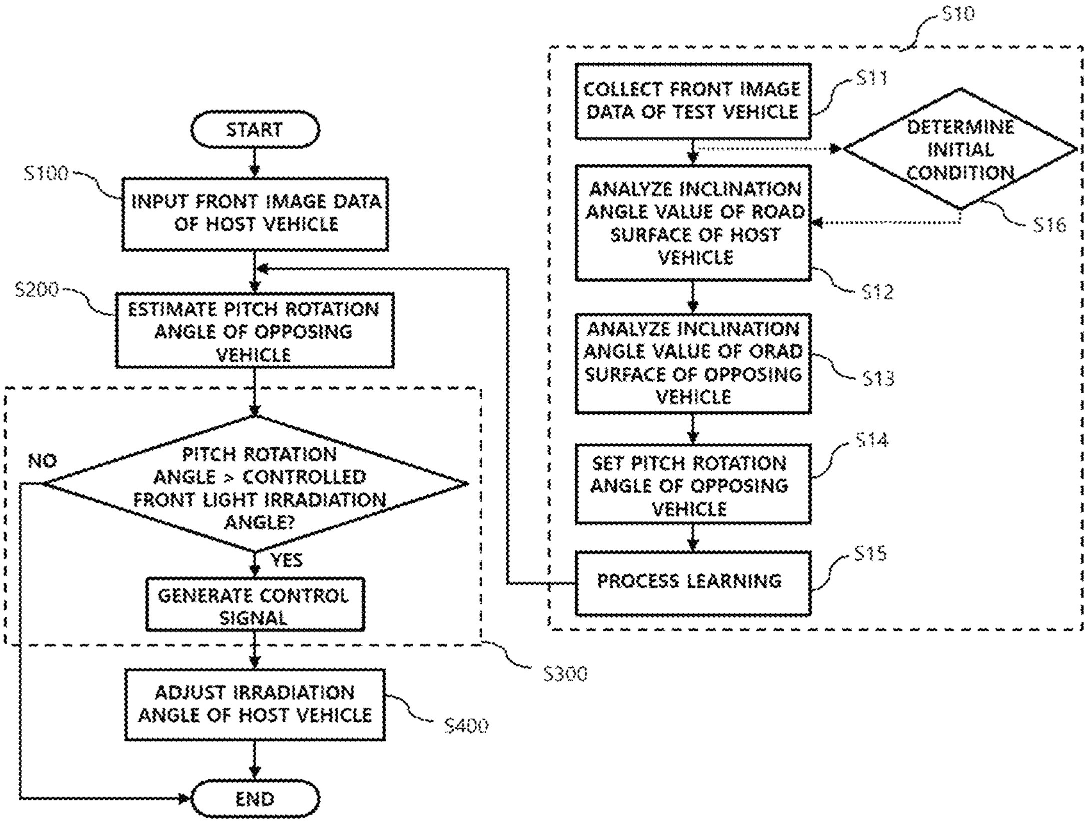
FIG. 4 is an exemplary flowchart showing a front light irradiation angle adjustment method according to an embodiment of the present disclosure.

FIG. 4 shows a flowchart of the front light irradiation angle adjustment method according to an embodiment of the present disclosure.

As shown in FIG. 4, the front light irradiation angle adjustment method according to an embodiment of the present disclosure may include inputting an image (S100), analyzing the image (S200), generating control (S300), and adjusting an irradiation angle (S400). Each step may use the front light irradiation angle adjustment system in which each operation is performed by an arithmetic processing means.

The description describes each step in detail as follows.

In the inputting of the image (S100), the image input unit 100 may receive the front image data of the host vehicle.

That is, in the inputting of the image (S100), the front image data of the host vehicle may be input.

The front image data is the image data showing the front of the vehicle that is generated by the front camera mounted/installed in the vehicle, the surround view monitor (SVM) front camera system or the like, and the means for inputting the front image data is not limited as long as the front situation of the vehicle may be monitored.

In addition, the host vehicle is the mass-produced vehicle under the normal condition and may not be mounted with the expensive the DGPS, the LiDAR, or the 3D-HD map. However, the adaptive front lighting system (AFLS) may be applied to this vehicle, and the front light irradiation angle may be adjusted based on the driving condition.

In the analyzing of the image (S200), the image analysis unit 200 may analyze the front image data input in the inputting of the image (S100) to estimate the pitch rotation angle of the opposing vehicle included in the front image data.

Here, the front image data itself may be the data acquired from the host vehicle.

Therefore, the estimated pitch rotation angle of the opposing vehicle may be used to determine how much the opposing vehicle is pitch-rotated based on the host vehicle.

In detail, in the analyzing of the image (S200), the input front image data may be analyzed using the pre-stored learning model to estimate the pitch rotation angle of the opposing vehicle included in the front image data.

To this end, as shown in FIG. 4, the front light irradiation angle adjustment method according to an embodiment of the present disclosure may include generating a model (S10) of generating the learning model that analyzes the input front image data by performing the supervised learning process of the pre-stored 3D object recognition network before the analyzing of the image (S200) is performed.

In the generating of the model (S10), the learning model that analyzes the input front image data and outputs the pitch rotation angle (or the vertical angle of the driving direction) of the vehicle, that is, an object included in the image may be generated by performing the supervised learning process of the pre-stored 3D object recognition network in advance.

The generating of the model (S10) may include collecting the image (S11), analyzing a host vehicle position (S12), analyzing a relative position (S13), analyzing a difference (S14), and processing learning (S15).

In the collecting of the image (S11), the front image data may be acquired from the vehicle. Here, the vehicle whose front image data is acquired in the collecting of the image (S11) may be the test vehicle mounted/installed with the DGPS, the LiDAR sensor, or the 3D-HD map, and any front image data may be acquired from the vehicle in various driving states.

The 3D object recognition network may recognize the 3D bounding box (BBox) of the vehicle included in the front image data. The vehicle may be positioned on the ground in a general driving image, and the yaw value of the horizontal driving direction of the vehicle may be recognized by the sensor such as the LiDAR sensor.

However, it is impossible to generate the learning data set of the pitch values requiring the information on the front and rear heights of the vehicle. The reason is that the vehicle front information is not known because the LiDAR sensor mounted on the rear reflects all the light beams.

Accordingly, in order to include the pitch rotation angle in the data set, the irradiation angle adjustment method according to an embodiment of the present disclosure may perform the detailed labeling operation in the analyzing of the host vehicle position (S12), the analyzing of the relative position (S13), and the analyzing of the difference (S14).

In the analyzing of the host vehicle position (S12), the information on the precise position of the vehicle may be recognized by using the differential GPS (DGPS) applied to the vehicle, and the inclination angle value of the road surface where the vehicle is positioned may be analyzed by applying the precise position recognized using the pre-stored 3D-HD map.

That is, the position of the host vehicle may be recognized using the DGPS. The inclination angle value of the road surface for the recognized position of the host vehicle may then be analyzed using the 3D-HD map.

In the analyzing of the relative position (S13), the LiDAR sensor mounted on the vehicle may be used to estimate the position of the opposing vehicle positioned in front of the vehicle.

That is, the distance between the opposing vehicle positioned in front of the vehicle and the host vehicle may be analyzed using the LiDAR sensor mounted on vehicle.

The information on the precise position of the vehicle may be recognized using the DGPS applied to the vehicle in the analyzing of the host vehicle position (S12). Therefore, the precise position information of the opposing vehicle may be estimated by applying the distance analyzed in the analyzing of the relative position (S13).

In addition, in the analyzing of the relative position (S13), the inclination angle value of the road surface where the opposing vehicle is estimated to be positioned may be analyzed using the pre-stored 3D-HD map.

Here, the 3D-HD map is a 3D high definition map, which further includes information on the inclination angle of the road, a height of the road, and an object (e.g., traffic light) around the road than a previous two-dimensional flat map. Therefore, it is possible to analyze the inclination angle value of the road surface for the recognized position when the information on the precise position of the vehicle is recognized using the DGPS or the like in the analyzing of the host vehicle position (S12) and the analyzing of the relative position (S13).

In the analyzing of the difference (S14), the pitch rotation angle of the opposing vehicle may be set as a calculated difference between the inclination angle value (or the inclination angle value of the road surface where the test vehicle is positioned) acquired in the analyzing of the host vehicle position (S12) and the inclination angle value acquired in the analyzing of the relative position (S13).

In detail, in the analyzing of the difference (S14), the pitch rotation angle of the opposing vehicle may be set by calculating the difference between the inclination angle value of the road surface where the test vehicle is positioned and the inclination angle value of the road surface where the opposing vehicle is positioned in front of the test vehicle is positioned.

That is, in order to determine how much the opposing vehicle is pitch-rotated based on the host vehicle, the pitch rotation angle of the opposing vehicle may be set by calculating the inclination angle values of the road surface where the respective vehicles are positioned and calculating the difference between the calculated inclination angle values.

In the processing of the learning (S15), the learning process of the stored 3D object recognition network may be performed by generating the learning data set including the front image data acquired in the collecting of the image (S11) and the pitch rotation angle set in the analyzing of the difference (S14).

In detail, the front image data and each object included in the front image data may be labeled, and the learning data set including the pitch rotation angle may be generated as the labeled data.

Here, in order to reduce the amount of learning computation of the learning model and improve the learning accuracy, as shown in FIG. 4, the front light irradiation angle adjustment method according to an embodiment of the present disclosure may further perform an operation of determining an initial condition (S16) of determining whether the driving condition of the vehicle and that of the opposing vehicle each meet predetermined conditions by analyzing the front image data acquired in the collecting of the image (S11) before the analyzing of the host vehicle position (S12) is performed.

In this way, the learning process of the 3D object recognition network may be performed only when the driving conditions of the two vehicles each meet the predetermined conditions based on a determination result in the determining of the initial condition (S16).

In detail, in the determining of the initial condition (S16), the front image data may be analyzed to determine whether the driving condition of the vehicle and that of the opposing vehicle each meet the predetermined conditions.

That is, the front image data may be analyzed to analyze the speed of the opposing vehicle (or the host vehicle in front) and the speed of the host vehicle. Here, the speed of the host vehicle may be input from the speedometer mounted in the vehicle, and the speed of the opposing vehicle may be analyzed using the speedometer of the host vehicle and the information on the distance to the opposing vehicle in the front image data (which may be estimated using the LiDAR sensor).

In addition, the wheel speed of the host vehicle may be input from the linked sensor.

The driving condition of the opposing vehicle may be first determined based on this speed. It may be determined whether the vehicle in front exists and whether the vehicle speed of the existing vehicle is constant as the driving condition of the opposing vehicle.

The corresponding front image data may not be used as the data to generate the learning data set based on the determination result when the vehicle in front does not exist or the vehicle speed of the existing vehicle is not constant.

The driving condition of the vehicle (or the driving condition of the host vehicle) may be determined based on the determination result when the vehicle having the constant speed exists in front. It may be determined, as the driving condition of the vehicle, whether the speed of the host vehicle is changed by the value less than the predetermined threshold value or whether the standard deviation of the speeds of the four wheels of the host vehicle is changed by the value less than the predetermined threshold value.

That is, when the momentary shaking occurs in the vehicle due to the vibration or the like based on the road surface condition, the position or angle of the vehicle may be changed on the front image data acquired at that moment. However, this case corresponds to the instantaneous movement. Accordingly, when the inclination angle value of the road surface where the host vehicle is positioned or the inclination angle value of the road surface where the opposing vehicle is positioned is analyzed based thereon, this analysis is very likely to be inaccurate.

Therefore, the driving condition of the vehicle may need to be stably matched with the inclination angle of the road surface.

To this end, the analyzing of the host vehicle position (S12), the analyzing of the relative position (S13), the analyzing of the difference (S14), and the processing of the learning (S15) may be performed only on the data in the state that is determined stable in the determining of the initial condition (S16) where the speed of the host vehicle is constant, the estimated speed of the opposing vehicle included in the front image data is constant, and the standard deviation of the speeds of the four wheels of the host vehicle is small to store the data as the ground truth (GT), thus generating the learning data set.

The learning data set generated in this way may include the front image data and the labeled data (e.g., 3D BBox coordinates, yaw value, and pitch rotation angle) to recognize the vehicle position included in the input front image data.

The 3D object recognition network is the 3D object recognition deep learning network, and may include the base network including the plurality of convolutional layers extracting features of the image, and the 3D object detection head layer classifying the candidate regions (or the anchor boxes) based on the extracted features and adjusting their positions and sizes.

When analyzing the input front image data through the 3D object recognition network, the background region class and the object (or vehicle) region class may be recognized, and the nearby 3D anchor box may thus recognize the vehicle in front. Here, the meanings of 9 output channels of the 3D object recognition network are as shown in Expression 1 above.

The 3D object recognition network may perform the learning so that the inferred value is equal to the label only for the box close to the labeled position among the 3D anchor boxes defined for each output position. In Expression 1 above, the position, size, and angle items may use the mean square error to acquire the loss, and c (here, zero is the background, and 1 is the vehicle) may add the cross entropy loss to perform the learning by using the stochastic gradient descent method. The 3D position of the vehicle on the image may be output when the front image data is input to the 3D object recognition network that completes its learning.

As such, in the analyzing of the image (S200), the input front image data may be analyzed by using the pre-stored learning model generated in the generating of the model (S10) to estimate the pitch rotation angle of the opposing vehicle included in the front image data.

In the generating of the control (S300), by the control generation unit 300, the control signal for adjusting the front light irradiation angle of front lights of the vehicle may be generated by comparing the currently-set front light irradiation angle of front lights of the vehicle with the estimated pitch rotation angle of the vehicle in front in the analyzing of the image (S200).

Here, the front light of every vehicle may have the same main function, and the control range of the irradiation angle may not be greatly deviated. However, the mounting position of the front light may be different for each vehicle. Therefore, the basic irradiation angle (or the ideal irradiation angle, that is, the irradiation angle in which the top of the front light beam is directed to be parallel to the road where the vehicle is driving) or the adjustment-controlled irradiation angle (or the irradiation angle controlled to be adjusted from the basic irradiation angle based on the information such as the vehicle speed, steering angle, height sensor, and shift lever of the host vehicle), by the AFLS, may be different for each vehicle, and the present disclosure is not limited thereto.

In detail, in the generating of the control (S300), the currently-set front light irradiation angle of front lights of the vehicle may be compared with the estimated pitch rotation angle of the vehicle in front, the control signal for adjusting the irradiation angle of front lights of the vehicle may be generated based on the value acquired by subtracting the pitch rotation angle of the vehicle in front from the front light irradiation angle of front lights of the vehicle that is controlled based on its current driving condition when the pitch rotation angle of the vehicle in front is larger, and the generated signal may be transmitted to the linked control (e.g., AFLS). Here, the currently-set front light irradiation angle may indicate the basic irradiation angle or the adjustment-controlled irradiation angle, by the AFLS.

In the adjusting of the irradiation angle (S400), the front light irradiation angle of front lights of the vehicle may be adjusted by transmitting the control signal generated in the generating of the control (S300) to the front light irradiation angle control of the vehicle linked thereto.

When the pitch rotation angle of the opposing vehicle (or the vehicle in front) that is analyzed based on the host vehicle is larger than the currently-set front light irradiation angle of the host vehicle, glare may occur to the driver of the opposing vehicle due to the inclination angle of the road surface where the host vehicle is positioned. Therefore, in the generating of the control (S300), the control signal for adjusting the front light irradiation angle may be generated based on the value acquired by subtracting the pitch rotation angle of the opposing vehicle (or the vehicle in front) that is analyzed based on the host vehicle from the currently-set front light irradiation angle of the host vehicle, and in the adjusting of the irradiation angle (S400), the front light irradiation angle of the host vehicle may be adjusted based on the received control signal.

As a result, as shown in FIG. 3, when the vertical angles of the driving directions of the host vehicle and the opposing vehicle are different from each other due to the environment where the inclination angle of the road is changed, the system and method of the present disclosure may control the front light irradiation angle of the host vehicle, thus increasing the driving convenience by causing no glare to the driver of the opposing vehicle, and improving the driving safety by allowing the driver of the host vehicle to maintain the wide field of view.

As set forth above, when the vertical angles of the driving directions of the host vehicle and the opposing vehicle are different from each other due to the environment where the inclination angle of the road is changed, the front light irradiation angle adjustment system and method according to the present disclosure may control the front light irradiation angle of the host vehicle, thus increasing the driving convenience by causing no glare to the driver of the opposing vehicle, and improving the driving safety by allowing the driver of the host vehicle to maintain the wide field of view.

Although the embodiments of the present disclosure are described as above, the embodiments disclosed in the present disclosure are provided not to limit the spirit of the present disclosure, but to describe the present disclosure. Therefore, the spirit of the present disclosure may include not only each disclosed embodiment, but also a combination of the disclosed embodiments. Further, the scope of the present disclosure is not limited by these embodiments. In addition, it is apparent to those skilled in the art to which the present disclosure pertains that a variety of variations and modifications could be made without departing from the scope of the present disclosure as defined by the appended claims, and all such appropriate variations and modifications should also be understood to fall within the scope of the present disclosure as equivalents.

What is claimed is:

1. A front light irradiation angle adjustment system for a vehicle driving on a road surface having an inclination angle, the method comprising:

a learning model that analyzes front image data, the learning model generated by performing a supervised learning process using a pre-stored three-dimensional (3D) object recognition network;

an image input unit receiving front image data of a host vehicle;

wherein the model generation unit includes:

an image collector acquiring front image data in multiple driving states from a test vehicle;

a host vehicle position analyzer recognizing a position of the test vehicle by using a differential global positioning system (DGPS) applied to the test vehicle, and applying the recognized position to a pre-stored 3D-high definition (HD) map to analyze a first inclination angle value of a road surface where the test vehicle is positioned;

a relative position analyzer using a light detection and ranging (LiDAR) sensor mounted on the test vehicle to estimate a position of an opposing vehicle positioned in front of the test vehicle, and analyzing a second inclination angle value of a road surface where the opposing vehicle positioned in front of the test vehicle is positioned as estimated using the pre-stored 3D-HD map;

a difference analyzer setting a pitch rotation angle of the opposing vehicle positioned in front of the test vehicle as a calculated difference between the first inclination angle value and the second inclination angle value; and a learning processor performing the supervised learning process of the pre-stored 3D object recognition network by generating a learning data set including the front image data acquired by the image collector and the pitch rotation angle set by the difference analyzer, and generating the learning model based on a learning result;

an image analysis unit analyzing the front image data using the learning model generated by a model generation unit to estimate a pitch rotation angle of an opposing vehicle included in the front image data; and a control generation unit generating a control signal for adjusting an irradiation angle of front lights of the host vehicle by comparing a set front light irradiation angle of the host vehicle with the estimated pitch rotation angle of the opposing vehicle.

2. The system of claim 1, wherein the model generation unit further includes an initial condition determinator analyzing the front image data acquired by the image collector to determine whether a driving condition of the test vehicle and that of the opposing vehicle positioned in front of the test vehicle each meet predetermined conditions, and performs the learning process of the 3D object recognition network only when the driving conditions of the two vehicles each meet the predetermined conditions based on a determination result by the initial condition determinator.

3. The system of claim 1, wherein the control generation unit compares the set front light irradiation angle of the host vehicle with the estimated pitch rotation angle of the opposing vehicle, generates the control signal for adjusting the front light irradiation angle of the host vehicle based on a value acquired by subtracting the estimated pitch rotation angle of the opposing vehicle from the front light irradiation angle of the host vehicle when the estimated pitch rotation angle of the opposing vehicle is larger, and transmits the generated control signal to a linked control.

4. A front light irradiation angle adjustment method for a vehicle driving on a road surface having an inclination angle, the method using a front light irradiation angle adjustment system in which each operation is performed by an electronic control unit the method comprising:

generating a learning model that analyzes front image data by performing a supervised learning process of a pre-stored three-dimensional (3D) object recognition network;

inputting an image of front image data of a host vehicle;

analyzing the front image data using the learning model to estimate a pitch rotation angle of the opposing vehicle included in the front image data;

wherein the generating of the learning model includes:

acquiring front image data in multiple driving states from a test vehicle;

determining a position of the test vehicle using a differential global positioning system (DGPS), and applying the determined position to a pre-stored 3D-high definition (HD) map to determine a first inclination angle value of a road surface where the test vehicle is positioned;

using a light detection and ranging (LiDAR) sensor mounted on the test vehicle to estimate a position of an opposing vehicle positioned in front of the test vehicle, and determining a second inclination angle value of a road surface where the opposing vehicle positioned in front of the test vehicle is positioned using the pre-stored 3D-HD map;

analyzing a difference between the first inclination angle value and the second inclination angle value to set a pitch rotation angle of the opposing vehicle positioned in front of the test vehicle; and performing the supervised learning process of the pre-stored 3D object recognition network by generating a learning data set including the front image data and the pitch rotation angle set in the analyzing of the difference, generating the learning model based on a learning result; and comparing a set front light irradiation angle of the host vehicle with the estimated pitch rotation angle of the opposing vehicle;

generating a control signal for adjusting the front light irradiation angle of the host vehicle based on a value acquired by subtracting the pitch rotation angle of the opposing vehicle from the front light irradiation angle of the host vehicle when the pitch rotation angle of the opposing vehicle is larger; and adjusting the front light irradiation angle of the host vehicle by transmitting the control signal to a front light irradiation angle control.

5. The method of claim 4, wherein the generating of the model further includes determining whether a driving condition of the test vehicle and that of the opposing vehicle positioned in front of the test vehicle each meets predetermined conditions by analyzing the front image data before the determining of the test vehicle position is performed, and the learning process of the 3D object recognition network is performed only when the driving conditions of the two vehicles each meet the predetermined conditions.

* * * * *